(No Model.)

S. HAMILTON.
CLOVER SEED HARVESTER.

No. 569,043. Patented Oct. 6, 1896.

WITNESSES:
C. Neveux
J. b. d. Acker

INVENTOR
S. Hamilton
BY
Munn & Co.
ATTORNEYS

UNITED STATES PATENT OFFICE.

SAMUEL HAMILTON, OF WILSON, MISSOURI.

CLOVER-SEED HARVESTER.

SPECIFICATION forming part of Letters Patent No. 569,043, dated October 6, 1896.

Application filed May 26, 1896. Serial No. 593,151. (No model.)

*To all whom it may concern:*

Be it known that I, SAMUEL HAMILTON, of Wilson, in the county of Adair and State of Missouri, have invented a new and Improved Clover-Seed Harvester, of which the following is a full, clear, and exact description.

My invention relates to a harvester especially adapted for harvesting clover-seed.

The object of the invention is to so attach a gathering device, rake, and mechanism for operating the rake to a mowing-machine that the gatherer will at all times travel close to the ground, it and the rake being unaffected by the vertical or vibratory movement of the body of the mowing-machine, and whereby also the stubble will assist in carrying the harvested straw to the rake.

Another object of the invention is to provide for the convenient and quick release of the gathered material from the gatherer.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
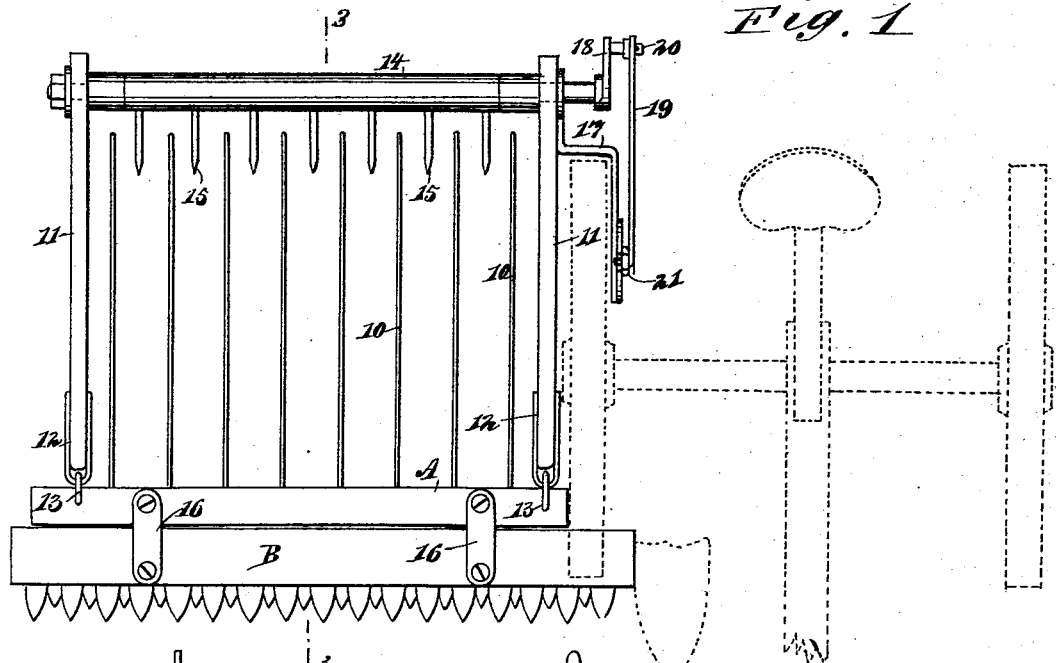
Figures 2, 4:
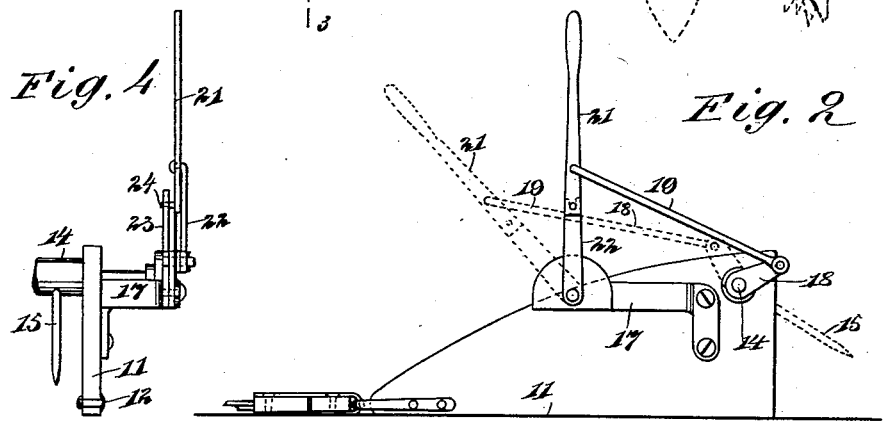
Figure 3:
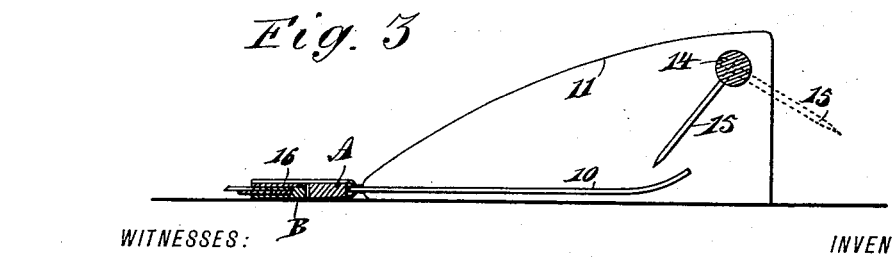

Figure 1 is a plan view of the device, illustrating its application to the mower-bar of a mowing-machine. Fig. 2 is a side elevation of the device, illustrating the lever for controlling the rake in two positions. Fig. 3 is a vertical transverse section taken on the line 3 3 of Fig. 1; and Fig. 4 is a front elevation of one side portion of the gatherer, illustrating particularly the application of the rake-manipulating lever to the same.

In carrying out the invention the device consists of a drop-bar A, from which a number of teeth 10 are rearwardly projected, the rear ends of the teeth being preferably upwardly curved, as shown in Fig. 3. Side or cheek pieces 11 are employed in connection with the drop-bar, and preferably the upper edges of these side or cheek pieces are given an inclination forwardly and downwardly from their rear ends, whereby the forward ends of the side pieces are quite narrow, and these side or cheek pieces 11 have a hinged connection with the drop-bar A, the connection being preferably made through the medium of two interlocking stirrups 12 and 13, one stirrup of each set being attached to a side or cheek piece and the other stirrup being secured to the drop-bar A near one of its ends. Therefore it is evident that the side or cheek pieces 11 will accommodate themselves to inequalities in the ground, leaving the drop-bar A independent to do likewise.

At the upper rear portions of the side or cheek pieces 11 a rake-head 14 is journaled, and the teeth 15 of the rake-head are adapted to extend downwardly beneath the teeth carried by the drop-bar A, as shown in Fig. 1.

Preferably at the right-hand side of the attachment the rake-head is made to extend beyond the right-hand side or cheek-piece 11, as is also shown in Fig. 1. The drop-bar is adapted for attachment to the mower-bar B of a mowing-machine, and this attachment is accomplished, preferably, through the medium of links 16, secured to the drop-bar and to the mower-bar.

The device has no other attachment to the mowing-machine than that illustrated and just described.

A bracket 17 is located upon the outer face of the right-hand side or cheek 11 of the device, the bracket being usually of angular shape, free at its forward end, and horizontally located. A crank-arm 18 is secured upon the projecting end of the rake-head 14, and a link 19 is attached to the said crank-arm 18 through the medium of a pin 20 or its equivalent, and the opposite end of the said link is pivotally connected with a lever 21, having a spring 22 attached to its lower end, which spring is pivotally secured to an enlargement on the free end of the bracket 17. A keeper 23 is secured also to the free end of the bracket 17, extending upward therefrom, and the upper end of the said bracket is provided with a notch or a recess adapted to receive a pin 24, secured to the lever, when the lever is parallel with the keeper, as shown in Fig. 4.

When the lever is in its upper or vertical position, the rake-teeth will extend downward between the teeth of the drop-bar and will have somewhat of a forward inclination, as shown in Fig. 1 and in positive lines in Fig. 3. When it is desired to release the material from the device, the lever 21 is first moved sidewise from its keeper, disengaging the pin 24, and is then carried forwardly, as shown in dotted lines in Fig. 2, rocking the rake-head in such manner as to give the teeth the rearward inclination shown in Figs. 2 and 3, permitting the material accumulated on the device to escape therefrom.

The teeth of the drop-bar A travel on the ground at the bottom of the stubble, and the stubble will take hold of the cut clover or other material that is harvested and carry it back to the rake in such manner that the heads of the clover will stand upward, and therefore the seed of the clover is not spilled or drawn out from the blossom.

The device is exceedingly economic, durable, and simple, and it is evident that it will thoroughly accomplish the object for which it is constructed. The upturned ends of the drop-bar teeth serve to direct the cut material to the rake, and the side pieces 11 effectually prevent the cut material from leaving the device at any other point than at its rear end.

Having thus described my invention, I claim as new and desire to secure by Letters Patent—

1. A gathering attachment for mowers, consisting of a drop-bar forming the forward portion of the attachment, teeth rearwardly projected from the drop-bar, side pieces having a hinge connection with the drop-bar outside of the teeth, a rake-head journaled in the said side pieces, the teeth whereof are arranged to extend between the teeth of the drop-bar, and means, substantially as described, for rocking the rake-head, as and for the purpose specified.

2. A gathering attachment for mowers, consisting of a drop-bar forming the front thereof, teeth rearwardly projected from the drop-bar, side pieces having a hinged connection with the drop-bar, being placed outside of the teeth of the same, a rake mounted to turn in the side pieces at the rear of the drop-bar teeth, a lever, a connection between the lever and the rake-head, and a locking device for the lever, substantially as set forth.

3. The combination, with the mower-bar of a mower, of a drop-bar attached to the mower-bar, teeth rearwardly projected from the drop-bar, side pieces located outside of the drop-bar teeth and having a hinged connection with the drop-bar, a rake mounted in the side pieces at the rear of the drop-bar teeth, a lever, and a connection between the said lever and the rake, whereby the latter may be rocked to and from the drop-bar teeth, as and for the purpose set forth.

4. The combination, with the mower-bar of a mowing-machine, a drop-bar attached to the mower-bar, and teeth rearwardly projected from the said drop-bar, the rear ends of the teeth being upwardly inclined, of side pieces located outside of the said teeth and having a hinged connection with the drop-bar, a rake-head journaled in the said side pieces, the teeth whereof are arranged to extend downward between the upturned ends of the drop-bar teeth, a shifting lever, a locking device for the same, and a crank-and-link connection between the shifting lever and the said rake-head, as and for the purpose set forth.

SAMUEL HAMILTON.

Witnesses:
F. M. BARNES,
H. W. HANN.